United States Patent
Saito et al.

(10) Patent No.: US 7,140,203 B2
(45) Date of Patent: Nov. 28, 2006

(54) METHOD FOR MANUFACTURING GLASS SUBSTRATE OF INFORMATION RECORDING MEDIUM

(75) Inventors: Yasuhiro Saito, Osaka (JP); Kazuishi Mitani, Osaka (JP); Tatsuro Umeyama, Osaka (JP); Koji Okuhata, Osaka (JP); Toshiaki Hashimoto, Osaka (JP)

(73) Assignee: Hoya Corporation, Tokyo (JP)

( * ) Notice: Subject to any disclaimer, the term of this patent is extended or adjusted under 35 U.S.C. 154(b) by 396 days.

(21) Appl. No.: 10/346,562

(22) Filed: Jan. 17, 2003

(65) Prior Publication Data

US 2003/0164005 A1  Sep. 4, 2003

(30) Foreign Application Priority Data

Jan. 18, 2002 (JP) .............................. 2002-010672
Apr. 25, 2002 (JP) .............................. 2002-123452

(51) Int. Cl.
C03C 21/00 (2006.01)
C03C 19/00 (2006.01)
C03C 15/00 (2006.01)

(52) U.S. Cl. .............................. 65/30.14; 65/31; 65/61

(58) Field of Classification Search ............... 65/30.14, 65/31, 61
See application file for complete search history.

(56) References Cited

U.S. PATENT DOCUMENTS

| 6,042,939 | A  | * | 3/2000  | Takahashi ................... 428/332 |
| 6,134,918 | A  | * | 10/2000 | Eto et al. .................... 65/30.14 |
| 6,395,634 | B1 | * | 5/2002  | Miyamoto ................... 438/691 |
| 6,553,788 | B1 | * | 4/2003  | Ikeda et al. .................... 65/31 |
| 6,782,717 | B1 | * | 8/2004  | Saito et al. ................. 65/30.14 |
| 6,899,943 | B1 | * | 5/2005  | Ikeda et al. ................. 428/141 |
| 2003/0079500 | A1 | * | 5/2003 | Umeyama ................... 65/30.1 |
| 2003/0110803 | A1 | * | 6/2003 | Saito et al. ................. 65/30.14 |
| 2005/0013048 | A1 | * | 1/2005 | Yamamoto et al. ......... 360/135 |

* cited by examiner

Primary Examiner—Sean Vincent
(74) Attorney, Agent, or Firm—Fish & Richardson P.C.

(57) ABSTRACT

Provided is a method for manufacturing a glass substrate for an information recording medium, which is advantageous in that oozing of an alkali and deformation of a texture are suppressed. The glass substrate is chemically reinforced, and a texture is formed in the glass substrate, and then treated with a neutral or alkaline aqueous solution. In the texture forming step, the surface of the glass substrate is etched in a depth of 0.5 to 10 nm.

20 Claims, 3 Drawing Sheets

METHOD FOR MANUFACTURING GLASS SUBSTRATE OF INFORMATION RECORDING MEDIUM

CROSS-REFERENCE TO RELATED APPLICATION

This application is based upon and claims priority to Japanese Patent Applications Nos. 2002-010672 filed on Jan. 18, 2002, and 2002-123452 filed on Apr. 25, 2002, the entire contents of which are incorporated herein by reference.

BACKGROUND OF THE INVENTION

The present invention relates to a a method for manufacturing a glass substrate for an information recording medium.

A conventional glass substrate has a surface strength improved by the following chemical reinforcing treatment. The glass substrate is immersed in a chemical reinforcement liquid, or molten potassium nitrate ($KNO_3$). In the glass substrate, metal ions having a relatively small ionic radius, such as lithium ions ($Li^+$) and sodium ions ($Na^+$), are present. The chemical reinforcing treatment causes the metal ions having a relatively small ionic radius present near the surface of the glass substrate to be replaced by potassium ions ($K^+$) having a relatively large ionic radius contained in the chemical reinforcement liquid to form a compression stress layer on the surface of the glass substrate, so that the glass substrate is reinforced chemically.

The chemically reinforced glass substrate is polished using a diamond slurry and an abrasive tape. This polishing forms a texture in the surface of the glass substrate.

Potassium ions incorporated into the glass substrate by the chemical reinforcing treatment are unlikely to ooze from the surface of the glass substrate. However, most of the compression stress layer in which potassium ions are present in a higher concentration is removed during formation of the texture, so that a layer containing sodium ions and lithium ions in a relatively high concentration on the surface of the glass substrate is exposed. The sodium ions and lithium ions having a relatively small ionic radius move relatively easily in the glass substrate. Therefore, an alkali metal, such as sodium or lithium, oozes from the glass substrate.

In the glass substrate from which an alkali oozes, a texture formed in the surface of the glass substrate changes with time. In a magnetic recording medium manufactured using a glass substrate having a texture which deformes to an undesirable form, the recorded magnetic data cannot be stably read by a magnetic head with high accuracy.

SUMMARY OF THE INVENTION

An object of the present invention is to provide a glass substrate having a stable texture and a method for manufacturing the same.

To achieve the above object, the present invention provides a method for manufacturing a glass substrate for an information recording medium. The method includes forming a glass substrate in a disc form. The glass substrate is chemically reinforced, then a primary surface of the glass substrate is etched in an average depth of 0.5 to 10 nm from the primary surface to form a texture in the primary surface.

A further aspect of the present invention is a disc-shaped glass substrate for an information recording medium. The glass substrate includes a texture in which a ratio of a maximum peak height Rp to a root mean square roughness RMS is 15 or less.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A glass substrate for an information recording medium according to the first embodiment of the present invention and a method for manufacturing the same will be described below.

Figure 3:
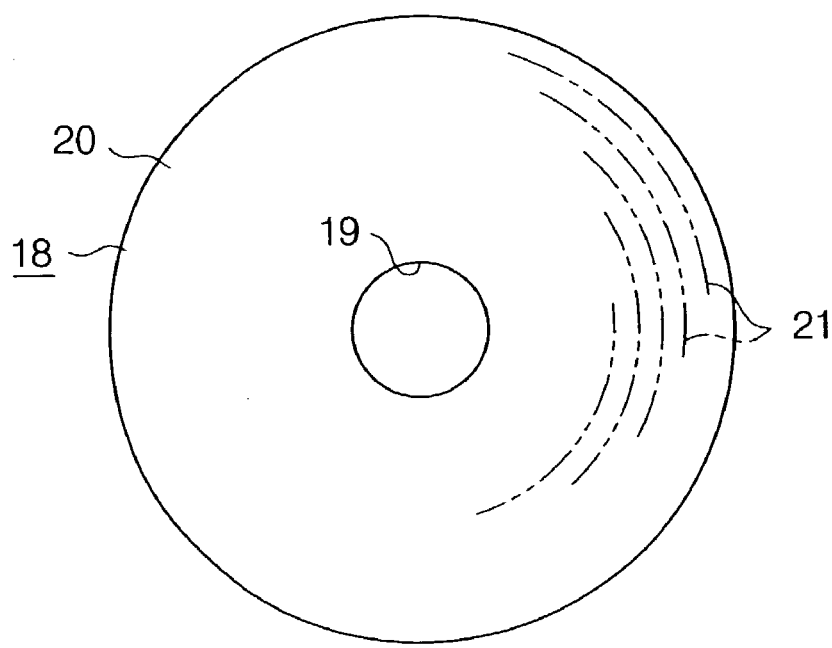
FIG. 3 is a diagrammatic plan view of a glass substrate according to the first embodiment of the present invention.

As shown in FIG. 3, an information recording medium glass substrate according to a preferred embodiment to the present invention is disc-shaped and has a round hole extending through its center. The glass substrate is used as the substrate of an information recording medium, such as a magnetic disc, a magneto-optic disc, or an optical disc. The glass substrate 18 is manufactured as follows.

Figure 1:
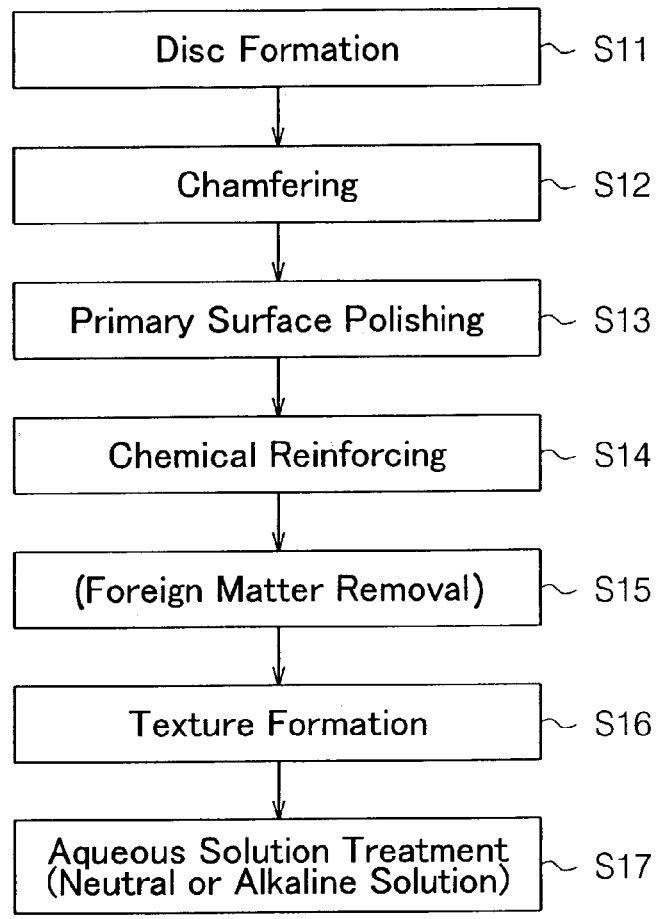
FIG. 1 is a flowchart showing a method for manufacturing a glass substrate according to a first embodiment of the present invention.

As shown in FIG. 1, a method for manufacturing the glass substrate 18 includes a disc forming step S11, chamfering step S12, a primary surface polishing step S13, a chemical reinforcing step S14, a foreign matter removing step S15, a texture forming step S16, and an aqueous solution treatment step S17. In the aqueous solution treatment step S17, at least one aqueous treatment solution selected from a neutral solution and an alkaline solution is used.

As a material for the glass substrate 18, soda-lime glass containing mainly of silicon dioxide ($SiO_2$), sodium oxide ($Na_2O$), and calcium oxide (CaO); aluminosilicate glass containing mainly of $SiO_2$, aluminum oxide ($Al_2O_3$), and $R_2O$ (wherein R represents potassium, sodium, or lithium); borosilicate glass; lithium oxide ($Li_2O$)—$SiO_2$ glass; $Li_2O$—$Al_2O_3$—$SiO_2$ glass; or R'O—$Al_2O_3$—$SiO_2$ glass (wherein R' represents magnesium (Mg), calcium (Ca), strontium (Sr), or barium (Ba)) can be used. Preferred is a glass for chemical reinforcement obtained by adding zirconium oxide ($ZrO_2$) or titanium oxide ($TiO_2$) to the above glass material.

With respect to the size of the glass substrate 18, there is no particular limitation, but the glass substrate 18 generally has an outer diameter of 3.5 inches (about 89 mm), 3.0 inches (about 76 mm), or 2.5 inches (about 64 mm), and a thickness of about 0.63 mm.

In the disc forming step S11, a sheet of a glass material (untreated glass sheet) is cut by a cutter made of a hard metal or diamond to form a plurality of disc-shaped glass substrates 18 each having a circular hole 19 in the center. The outer periphery defining the outer contour of the glass substrate 18 and the inner periphery defining the circular hole 19 may be cut either simultaneously or the outer periphery may be first cut and then the inner periphery may be cut.

In the chamfering step S12, the outer periphery and inner periphery of the glass substrate 18 are ground so that the glass substrate 18 has a predetermined outer diameter and a predetermined inner diameter and sharp edges of the outer periphery and inner periphery are chamfered. In the grinding processing and chamfering processing, for example, a grindstone having attached thereto diamond abrasive grain is used.

The chamfering for the outer periphery and inner periphery of the glass substrate may comprise two steps using two types of grain having different diameters. For example, the peripheries may be roughly chamfered by #325 coarse diamond abrasive grain and then chamfered by #500 (or #600) fine diamond abrasive grain.

When the glass substrate 18 has an outer diameter and an inner diameter close to the respective predetermined values, grinding for the outer periphery and inner periphery of the glass substrate 18 may be omitted.

To smooth the inner periphery surface and outer periphery surface of the glass substrate 18, the inner periphery surface and outer periphery surface may be polished by means of an abrasive material. It is preferred that the thickness of the inner periphery surface and outer periphery surface polished is 5 to 20 micrometers. When the thickness of the periphery surface polished is less than 5 micrometers, the inner periphery surface and outer periphery surface cannot be satisfactorily smoothed. On the other hand, even when the inner periphery surface and outer periphery surface are polished in a thickness greater than 20 micrometers, the inner periphery surface and outer periphery surface cannot be further improved in smoothness. As the abrasive material, a rare earth oxide, such as cerium oxide or lanthanum oxide, zirconium oxide, manganese dioxide, aluminum oxide, or colloidal silica can be used. From the viewpoint of achieving excellent polishing efficiency, preferred is a rare earth oxide abrasive material, and more preferred is a cerium oxide abrasive material.

In the primary surface polishing step S13, the primary surface 20 of the glass substrate 18 is polished by lapping polish and smoothing polish. The primary surface 20 is the surface in which information is recorded when the glass substrate 18 is used as a glass substrate for an information recording medium.

Lapping polish makes the thickness of the glass substrate 18 a predetermined value, and removes warpage or unevenness to improve the flatness of the primary surface 20 and removes a relatively large defect, such as protrusion or crack, to lower the surface roughness. When glass having relatively less warpage or unevenness is used, lapping polish may be omitted.

Smoothing polish is conducted for securing flatness and smoothness of the primary surface sufficient to be used as an information recording medium. A preferred abrasive powder is a cerium oxide abrasive powder having high abrasive force for glass. From the viewpoint of achieving both excellent smoothness and high polishing rate, a preferred abrasive powder generally has a particle diameter of about 0.1 to 3 micrometers. When using a double-sided grinder comprising an upper platen and a lower platen each having attached thereto a synthetic leather suede pad, both surfaces of the glass substrate can be finely polished at a low cost. For achieving both high polishing rate and excellent smoothness, smoothing polish may comprise two steps.

It is desired that the abrasive powder is removed from the glass substrate 18 after the primary surface polishing step S13.

The chemical reinforcing step S14 is conducted for imparting to the glass substrate 18 impact resistance, oscillation resistance, and heat resistance sufficient to be used as an information recording medium. In the chemical reinforcing step S14, part of ions contained in a layer (first layer) near the surface of the glass substrate 18, for example, monovalent metal ions, such as lithium ions or sodium ions, are replaced by ion-exchanging by monovalent metal ions having a larger ionic radius, such as sodium ions or potassium ions, so that a compression stress layer (a chemical reinforcement layer or a second layer) is formed on the surface of the glass substrate 18, thus improving the strength of the glass substrate 18. Therefore, the glass substrate 18 is prevented from being broken when used as an information recording medium which is rotated at a high speed.

In the chemical reinforcing step S14, the glass substrate 18 is immersed in a chemical reinforcement molten salt for a predetermined period of time. As the salt for chemical reinforcement, potassium nitrate ($KNO_3$), sodium nitrate ($NaNO_3$), and silver nitrate ($AgNO_3$) are used individually or in combination. It is preferred that the chemical reinforcement liquid is maintained at a temperature about 50 to 150 degrees Centigrade lower than the strain point of the glass substrate 18. It is more preferred that the temperature of the chemical reinforcement liquid is about 350 to 400 degrees Centigrade.

When the temperature of the chemical reinforcement liquid is less than the temperature about 150 degrees Centigrade lower than the strain point of the glass substrate 18, the glass substrate 18 cannot be satisfactorily chemically reinforced. On the other hand, when the temperature of the chemical reinforcement liquid exceeds the temperature about 50 degrees Centigrade lower than the strain point of the glass substrate 18, strain is likely to occur in the glass substrate 18 when the glass substrate 18 is subjected to the chemical reinforcing treatment.

In the chemical reinforcing step S14, a plurality of the glass substrates 18 are held in a holder for chemical reinforcement, and a plurality of holders for chemical reinforcement are contained in a cage and the cage is immersed in the chemical reinforcement liquid contained in a chemical reinforcing bath to effect ion exchange.

Figure 4:
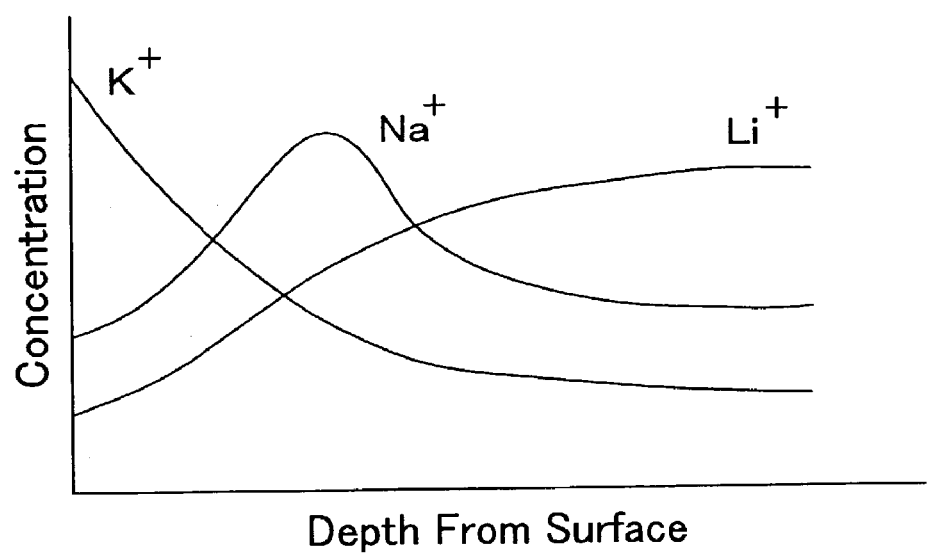
FIG. 4 is a graph showing the change of the composition of a glass substrate against the depth from the surface of the glass substrate.

FIG. 4 is a graph showing the composition of the glass substrate 18 which is chemically reinforced. The depth from the surface of the glass substrate is taken as the abscissa, and the concentration of metal ions is taken as the ordinate. The ion exchange increases the concentration of the potassium ions ($K^+$) on the surface of the chemically reinforced glass substrate 18. The concentration of potassium ions gradually decreases at deeper positions from the surface of the glass substrate 18. Since the ion exchange decreases the concentration of the lithium ions ($Li^+$), the concentration of the lithium ions is lowest at the surface of the glass substrate 18 and gradually increases at deeper positions from the surface of the glass substrate 18. Further, the concentration of sodium ions ($Na^+$) decreases when ion exchange is performed with the potassium ions and increases when ion exchange is performed with the lithium ions. Thus, the concentration of the sodium ions is low at the surface of the glass substrate 18, increases at deeper positions from the surface of the glass substrate 18, reaches its peak at a certain depth, and decreases at positions that are further deeper.

In the chemical reinforcing step S14, a compression stress layer is formed on the surface of the glass substrate 18. It is preferred that the compression stress layer has a thickness of 100 to 200 micrometers. When the thickness of the compression stress layer is less than 100 micrometers, the glass substrate 18 is unsatisfactorily chemically reinforced and hence cannot exhibit satisfactory performance required for a substrate for an information recording medium. On the other hand, when the thickness of the compression stress layer exceeds 200 micrometers, the temperature of the chemical reinforcement liquid must be elevated or the period of time during which the glass substrate 18 is immersed in the chemical reinforcement liquid must be prolonged, causing the production efficiency of the glass substrate 18 to be lowered.

In the chemical reinforcing step S14, the surface of the glass substrate 18 is roughened. The primary surface 20 of the glass substrate 18 after the chemical reinforcing step S14 preferably has an average surface roughness Ra of 0.1 to 1.5 nm, further preferably 0.1 to 1.0 nm, especially preferably 0.1 to 0.6 nm. When the average surface roughness Ra is less than 0.1 nm or exceeds 1.5 nm, it is difficult to form a fine texture suitable for an information recording medium in the texture forming step S16.

After the chemical reinforcing step S14, if necessary, a foreign matter removing step S15 is conducted. The foreign matter removing step S15 comprises at least one step selected from an acid treatment step and a neutral solution or alkaline solution treatment step. The acid treatment step may be conducted either before or after the neutral solution or alkaline solution treatment step. The neutral solution is mainly comprised of pure water, but it may be prepared by adding an organic solvent, a surfactant, or a chelating agent to pure water. As the alkaline solution, an inorganic alkaline solution, such as aqueous ammonia, or an organic alkaline solution is used. A preferred alkaline solution is an aqueous solution of tetramethylammonium hydroxide since the aqueous solution of tetramethylammonium hydroxide is a strong alkali and has a low etching effect for glass.

It is desired that the acidic aqueous solution is an aqueous solution of at least one kind selected from hydrofluoric acid, fluorosilicic acid, sulfuric acid, nitric acid, hydrochloric acid, sulfamic acid, acetic acid, tartaric acid, citric acid, gluconic acid, malonic acid, and oxalic acid. Each of hydrofluoric acid and fluorosilicic acid is an acid having an etching effect. Each of sulfuric acid, nitric acid, hydrochloric acid, and sulfamic acid is a strong acid and can dissolve foreign matters, such as iron. Each of acetic acid, tartaric acid, citric acid, gluconic acid, malonic acid, and oxalic acid has a chelating effect, and can dissolve foreign matters, such as iron, and prevent the dissolved foreign matters from precipitating again.

In the foreign matter removing step S15, foreign matters adhering to the surface of the glass substrate 18 are removed. Therefore, the surface of the glass substrate 18 is prevented from suffering a damage due to foreign matters in the texture forming step S16.

It is desired that the acidic aqueous solution contains a reductant. Such an acidic aqueous solution can promote decomposition of metal oxides, such as cerium oxide, and remove foreign matters while suppressing etching of the glass substrate 18. It is preferred that the reductant is hydrogen peroxide or ascorbic acid since they have high reducing ability and are unlikely to become contaminants.

It is preferred that the foreign matter removing step S15 is conducted before the aqueous solution treatment step S17. The reason for this resides in that metal oxides, such as cerium oxide, are negatively charged in an alkaline solution and therefore electrostatically repel the glass substrate 18 which is negatively charged, so that foreign matters can be removed efficiently and further the amount of the glass substrate 18 etched can be reduced.

In the foreign matter removing step S15, the glass substrate 18 may be merely immersed in an aqueous solution for treatment, but, by combining the immersion in the treatment solution with heating the glass substrate 18, irradiating the glass substrate 18 with ultrasonic waves, or scrubbing the glass substrate 18 using a brush, it is possible to improve the efficiency of the treatment and shorten the treatment time.

In the texture forming step S16 subsequent to the chemical reinforcing step S14 or the foreign matter removing step S15, texture 21 shown in FIG. 3 is formed in the primary surface 20 of the glass substrate 18. The texture 21 comprises a number of ridges 25 and valleys 27 extending in the circumferential direction of the glass substrate 18 (see FIG. 5). In the texture forming step S16, the glass substrate 18 in which the primary surface 20 has an average surface roughness Ra of 0.1 to 1.5 nm is treated, and hence, a fine texture suitable for an information recording medium is formed.

When the chemical reinforcing step S14 is conducted after the texture forming step S16, there is a risk that the form of the texture 21 is disadvantageously changed by chemical reinforcement. Therefore, it is preferred that the texture forming step S16 is conducted after the chemical reinforcing step S14. Thus, the texture 21 having a desired form and high linear density as well as greater linear length is formed with high accuracy.

In the texture forming step S16, the primary surface 20 of the glass substrate 18 is rubbed using a tape member 23 while placing the abrasive diamond slurry 24 dropwise onto the primary surface 20 of the glass substrate 18. In this step, the tape member 23 may be moved while rotating the glass substrate 18.

Figure 2:
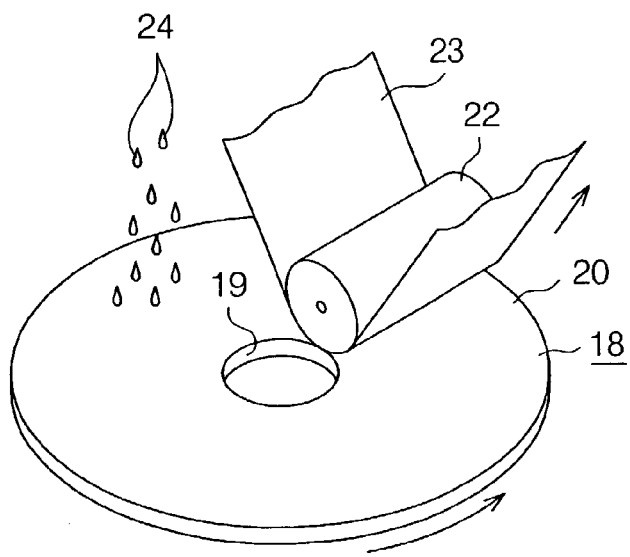
FIG. 2 is a diagrammatic perspective view of an apparatus for forming a texture in a glass substrate.

In the texture forming step S16, a so-called texturing machine, which is used to process the texture of an aluminum substrate, may be used. The texturing machine is illustratively described with reference to FIG. 2. The texturing machine comprises a rotatable press roller 22 extending in the direction of the diameter of the glass substrate 18. The press roller 22 has a length substantially equal to the radius of the glass substrate 18. As indicated by the arrow shown in FIG. 2, the tape member 23 is fed so that it passes through the press roller 22 and the glass substrate 18, and pressed against the primary surface 20 by the press roller 22. As the tape member 23, woven fabric, nonwoven fabric, or flocked fabric in the form of tape is used. With respect to the material for tape member 23, there is no particular limitation, and any materials, e.g., polyethylene fiber can be used as long as it is used for forming a texture of this type.

The diamond slurry 24 is prepared by dispersing diamond abrasive grain in a solvent. The diamond abrasive grain preferably has an average particle diameter ($D_{50}$) of 0.05 to 0.3 micrometers, more preferably 0.08 to 0.25 micrometers. When the average particle diameter $D_{50}$ is less than 0.05 micrometers, the ability of forming the texture 21 becomes poor, so that the rate of forming the texture 21 is lowered, leading to an increase in the cost of the texture forming step. On the other hand, when the average particle diameter $D_{50}$ exceeds 0.3 micrometers, a large amount of small ridges per unit length in the direction of the radius of the glass substrate 18 cannot be formed, making it difficult to satisfactorily increase the linear density of the texture 21. With respect to the form and crystalline properties of the diamond abrasive grain, there is no particular limitation. Single crystalline abrasive grain or polycrystalline abrasive grain can be used. For improving the grinding force of the diamond slurry 24, cerium oxide or manganese oxide abrasive grain or an alkali agent may be added to the diamond slurry 24.

With respect to the solvent used for the diamond slurry 24, there is no particular limitation. For improving the dispersibility of the diamond abrasive grain, a surfactant may be added to the diamond slurry 24.

The texture 21 is formed under conditions for processing appropriately selected depending on the desired form, density, and length. Typical conditions for processing are as follows.

(Conditions 1)

| | |
|---|---|
| Tension of tape member 23: | 22.1 N |
| Moving speed of tape member 23: | 7.6 cm/min |
| Pressure of roller 22: | 30.9 N |
| Rotation speed of glass substrate 18: | 300 rpm |
| Material of tape member 23: | Polyester |
| Average diameter of diamond abrasive grain: | 0.2 micrometers |
| Feeding rate of diamond slurry 24: | 20 ml/min |

(Conditions 2)

Substantially the same conditions as conditions 1 except that the average particle diameter of the diamond abrasive grain is 0.1 micrometers.

The average thickness of the glass substrate 18 removed in the texture forming step S16, that is, average removing depth is 0.5 to 10 nanometers (nm), preferably 0.5 to 4 nm. When the average removing depth is less than 0.5 nm, the valleys 27 in the texture 21 are shallow, so that the magnetism holding power is unsatisfactory. On the other hand, when the average removing depth exceeds 10 nm, in the surface of the glass substrate 18, most of the region having a high potassium ion concentration is removed and thus a region containing a large amount of sodium or lithium is exposed, so that an alkali metal is likely to ooze from the glass substrate 18. Further, when microscopic unevenness of the tape member 23 or foreign matters cause the removing depth to be partially reduced, the portion of the glass substrate in which the removing depth is reduced is far higher than the surrounding portion. When using such a substrate, a reading apparatus, such as a magnetic head, suffers an occurrence of crush, thus lowering the reliability of the hard disc drive.

Parameters indicating roughness of the texture 21 (maximum peak height Rp, root mean square roughness RMS, and maximum valley height Ry) are measured by means of an atomic force microscope (AFM; NanoScope, manufactured by Digital Instrument Co.). A ratio Rp/RMS is preferably 15 or less, further preferably 5 or less. When the ratio Rp/RMS exceeds 15, the lifting height (HTO) of the magnetic head exceeds 5 nm, and thus the flying stability of the magnetic head is deteriorated, thus not preferable. On the other hand, when the ratio Rp/RMS is less than 5, the lifting height HTO is 4 nm or less, and therefore the flying stability of the magnetic head is improved, thus preferable.

It is desired that the maximum valley height Ry is 10 nm or less. When the maximum valley height Ry exceeds 10 nm, the magnetic layer formed on the texture 21 is deteriorated in the orientation of crystals at the deep groove portion and therefore lowered in the magnetic properties, so that a magnetic head may not be able to read a signal of the magnetic data.

Figure 5:
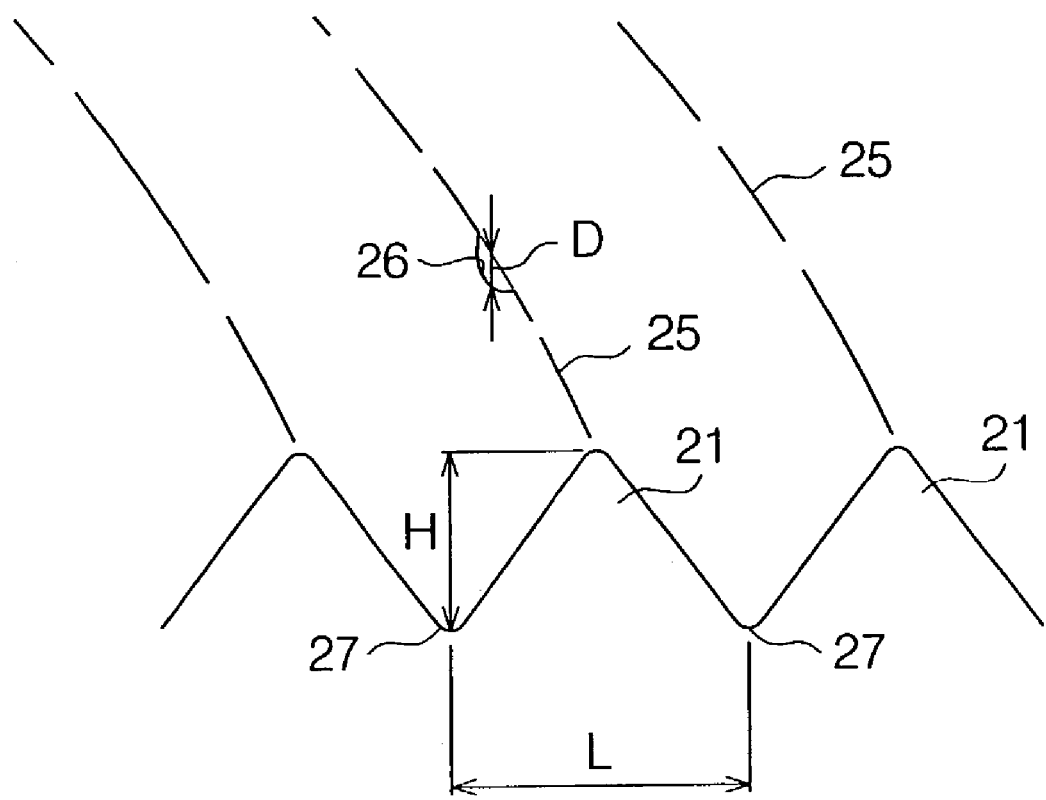
FIG. 5 is an enlarged view of the texture of FIG. 3.

As shown in FIG. 5, the ridges 25 have recesses 26. A space L (width of the texture 21) between the adjacent valleys 27 or the ridges 25 is 10 to 200 nm, and, when the ridges 25 have a height H of 2 to 10 nm, it is preferred that the recesses 26 have an average recess depth D of 2 nm or less, and it is preferred that a ratio (H/D) of the height H to the average recess depth D of the recesses 26 is 10 or more. It is more preferred that the average recess depth D is 0.5 nm since the lifting height HTO is maintained at 4 nm or less. When the average recess depth D exceeds 2 nm and the ratio H/D is less than 10, the lifting height HTO disadvantageously exceeds 5 nm to deteriorate the flying stability of the magnetic head.

After the texture forming step S16, an aqueous solution treatment step S17 is conducted. In the aqueous solution treatment step S17, foreign matters including the diamond slurry 24 are removed from the glass substrate 18 using a neutral or alkaline solution. It is preferred that the aqueous solution treatment step S17 is conducted by a method in which the glass substrate 18 is rubbed using a cleaning belt in the presence of the neutral or alkaline solution, a method in which the glass substrate 18 is rubbed using a scrubbing member in the presence of the neutral or alkaline solution, a method in which the glass substrate 18 is immersed in the neutral or alkaline solution while irradiating the glass substrate 18 with ultrasonic waves, or a method in which the glass substrate 18 is showered with the neutral or alkaline solution. These methods may be conducted in combination.

The method in which the glass substrate 18 is rubbed using a cleaning belt is conducted by rubbing the glass substrate 18 using the cleaning belt in the circumferential direction of the glass substrate while feeding the neutral or alkaline solution onto the primary surface 20 of the glass substrate 18 and pressing the cleaning belt against the primary surface 20 of the glass substrate 18. A surfactant, a chelating agent, or an organic solvent may be added to the glass substrate 18. In the aqueous solution treatment step S17, the same apparatus as the above-mentioned texturing machine is used. The following is an example of conditions for the treatment.

| | |
|---|---|
| Tension of cleaning belt: | 8.8 N |
| Rate of travel of cleaning belt: | 7.6 cm/min |
| Pressure of roller: | 8.8 N |
| Rotation speed of glass substrate: | 300 rpm |
| Material of cleaning belt: | Nylon |
| Feeding rate of neutral or alkaline solution: | 20 ml/min |

As the neutral or alkaline solution, the neutral or alkaline solution used in the foreign matter removing step S15 can be used.

Very small foreign matters strongly adhering to the primary surface 20 of the glass substrate 18 are efficiently removed by a physical force using a cleaning belt. The cleaning belt travels in the circumferential direction of the glass substrate 18, and hence change of the form of the texture is suppressed to the minimum.

If an acidic aqueous solution is used in the aqueous solution treatment step S17, the primary surface 20 of the glass substrate 18 is ununiformly etched, so that the form of the texture is markedly changed. In contrast, the aqueous solution treatment step S17 using the neutral or alkaline solution advantageously causes no deformation of the texture.

The method in which the glass substrate 18 is rubbed using a scrubbing member is described below. The scrubbing member is, for example, a sponge. By scrubbing the surface of the glass substrate 18 using a sponge in the direction of the diameter of the surface of the glass substrate 18, defective protrusions in a peak form are efficiently removed. The defective protrusion in a peak form is an extremely high protrusion which is higher than the average height. A glass substrate on which defective protrusions remain adversely affects the flying stability of a magnetic head. The defective protrusion extends in the circumferential direction of the glass substrate 18. Therefore, by rubbing the surface of the glass substrate 18 using a sponge in the direction of the diameter of the glass substrate 18, defective protrusions can be efficiently removed. A preferred material for the sponge is a rigid sponge having an Asker C hardness of 40 or more. Such a rigid sponge can efficiently remove defective protrusions. Asker C hardness complies with standard SRISO101, which is regulated by the Society of Rubber Industry, Japan. Conditions for scrubbing, such as the pressure and the rotation speed of the glass substrate during scrubbing, are appropriately selected depending on the state of the surface of the glass substrate 18 which is cleaned solely by the neutral or alkaline solution.

The method in which the glass substrate 18 is cleaned by irradiation of ultrasonic waves is described below. To prevent deformation of the texture 21, it is preferred that the frequency of the ultrasonic waves is 38 kHz or more, the output is 1 W/cm$^2$ or less, the irradiation time is 2 to 20 minutes, and the temperature of the neutral or alkaline solution is 70 degrees Centigrade or lower. By irradiating the glass substrate with ultrasonic waves, the remaining foreign matters relatively weakly adhering to the surface of the glass substrate 18 are completely removed.

The method in which the glass substrate 18 is showered with the neutral or alkaline solution is described below. To prevent deformation of the texture 21, the glass substrate 18 is showered with the neutral or alkaline solution in the circumferential direction thereof. The rate and pressure of the showering are appropriately selected depending on the amount of the foreign matters remaining on the surface of the glass substrate 18.

When the method in which the glass substrate 18 is rubbed using a cleaning belt in the presence of the neutral or alkaline solution, the method in which the glass substrate 18 is rubbed using a scrubbing member in the presence of the neutral or alkaline solution, the method in which the glass substrate 18 is irradiated with ultrasonic waves in the neutral or alkaline solution, and the method in which the glass substrate 18 is showered with the neutral or alkaline solution are employed in combination, it is preferred that the methods are conducted in the following order: (1) the rubbing method using a cleaning belt, (2) the rubbing method using a scrubbing member, (3) the ultrasonic waves irradiation method, and (4) the showering method.

After the aqueous solution treatment step S17, the glass substrate 18 is dried. As examples of drying methods, there can be mentioned a drying method using isopropyl alcohol (IPA) and a spin drying method.

It is desired that the total removing depth for the glass substrate 18 in the foreign matter removing step S15, the texture forming step S16, and the aqueous solution treatment step S17 is 10 nm or less. In such a case, oozing of an alkali from the glass substrate 18 is surely suppressed.

The sheet of a glass material is transferred to the chemical reinforcing step S14 subsequent to the disc forming step S11, the chamfering step S12, and the primary surface polishing step S13. In the chemical reinforcing step S14, lithium ions in the glass substrate 18 are replaced by potassium ions and sodium ions, and sodium ions in the glass substrate 18 are replaced by potassium ions.

In the texture forming step S16, the glass substrate 18 is removed in an average thickness of 0.5 to 10 nm, and therefore the compression stress layer having a relatively high potassium ion concentration remains in a satisfactory thickness. Thus, the state of the surface of the glass substrate 18 is kept as it is.

In the aqueous solution treatment step S17, the surface of the glass substrate 18 having a texture formed is cleaned.

The first embodiment has the following advantages.

In the method for manufacturing a glass substrate according to the first embodiment, the texture forming step S16 is conducted after the chemical reinforcing treatment. The average thickness of the glass substrate 18 removed in the texture forming step S16 is 0.5 to 10 nm, and therefore the compression stress layer having a high potassium ion concentration remains in a satisfactory thickness. Thus, oozing of an alkali from the glass substrate 18 is suppressed, so that deformation of the texture 21, namely, changes of the texture 21 in the maximum peak height, the maximum valley height, or the surface roughness are suppressed, thus improving the weathering resistance of the glass substrate 18.

After forming the texture 21, the aqueous solution treatment step S17 is conducted. Therefore, the surface of the glass substrate 18 is cleaned, and hence deformation of the texture 21 caused by etching of the glass substrate 18 is prevented.

The aqueous solution treatment step S17 comprises at least one step selected from rubbing the glass substrate using a cleaning belt, rubbing the glass substrate using a scrubbing member, irradiating the glass substrate with ultrasonic waves, and showering the glass substrate with a neutral or alkaline solution. Thus, foreign matters are efficiently removed by a physical force.

When the alkaline solution is tetramethylammonium hydroxide solution, the glass substrate 18 is cleaned without being etched.

The foreign matter removing step S15 is conducted before the texture forming step S16. Therefore, the surface of the glass substrate 18 can be prevented from suffering a flaw in the texture forming step S16.

The foreign matter removing step S15 comprises a first foreign-matter removing treatment using a neutral or alkaline solution, and a second foreign-matter removing treatment using an acidic aqueous solution. Therefore, an abrasive material, such as cerium oxide, or foreign matters, such as iron (metallic iron), are removed from the glass substrate 18. Especially, by using a strong acid having an etching effect or a chelating effect, the dissolved abrasive material or foreign matters, such as iron, are prevented from precipitating again, and thus foreign matters are efficiently removed from the glass substrate 18.

By using an acidic aqueous solution containing a reductant, decomposition of metal oxides can be promoted while suppressing etching of the glass substrate 18, thus improving the efficiency of removing foreign matters.

Next, the second embodiment of the present invention is described mainly in respect of the difference between the first embodiment and the second embodiment.

In the second embodiment, the water used for preparing the neutral or alkaline solution used in the aqueous solution treatment step S17 is different from that used in the first embodiment. The water used in the second embodiment is electrolyzed water obtained by electrolyzing an aqueous solution of an inorganic salt, or a solution obtained by dissolving a gas in water. Examples of inorganic salts include alkali metal salts, such as sodium chloride. The electrolyzed water is water formed in an electrolytic cell on the anode side or on the cathode side.

By using the electrolyzed water or gas-dissolved solution, foreign matters including an abrasive material can be removed from the surface of the glass substrate 18 without damaging the texture 21. The electrolyzed water or gas-dissolved solution is called functional water. In the functional water, a cluster of water molecules has a relatively small size. Therefore, the functional water has a relatively high degree of penetration and thus lowers the affinity of foreign matter particles with the surface of the glass substrate 18, so that the foreign matter particles easily leave the surface of the glass substrate 18. Thus, a cleaning agent, such as a surfactant, can be used in a reduced amount.

It is preferred that the glass substrate 18 is cleaned with a functional water while being irradiated with ultrasonic waves. In this case, a phenomenon at a high energy called cavitation occurs and thus a large amount of radicals are formed in the functional water, thus further improving the effect of the functional water.

A preferred electrolyzed water is a catholyte. The catholyte is water taken from an electrolytic cell on the cathode side in electrolysis of water, and contains hydrogen gas.

A preferred gas-dissolved solution is a solution obtained by dissolving hydrogen gas in water. When using a neutral or alkaline solution prepared from a catholyte or an hydrogen-dissolved solution, foreign matters are likely easily removed from the surface of the glass substrate 18. It is presumed that the reason for this resides in an effect of an electrokinetic potential, i.e., zeta potential at the interface between the solution and the glass substrate 18.

By the method for manufacturing a glass substrate according to the second embodiment, deformation of the texture is suppressed, and foreign matter particles are easily and rapidly removed from the surface of the glass substrate 18.

Hereinbelow, the present invention will be described with reference to the following Examples.

EXAMPLE 1

Aluminosilicate glass having the composition below was shaped into a disc form having a thickness of 0.6 mm, an outer diameter of 65 mm, and an inner diameter of 20 mm.

| | |
|---|---|
| $SiO_2$: | 63 mol % |
| $Al_2O_3$: | 16 mol % |
| $Na_2O$: | 11 mol % |
| $Li_2O$: | 4 mol % |
| MgO: | 2 mol % |
| CaO: | 4 mol % |

The inner periphery surface and outer periphery surface of the glass substrate were chamfered. The primary surface of the glass substrate was subjected to lapping polish and smoothing polish. In the smoothing polish, both surfaces of the glass substrate were polished using an abrasive material comprising cerium oxide and an abrasive pad having an Asker C hardness of 70.

The abrasive powder adhered to the surface of the glass substrate was removed by sponge cleaning using polyvinyl alcohol and ultrasonic cleaning using a strongly alkaline solution. The glass substrate was rinsed with pure water. The resultant glass substrate was dried in isopropyl alcohol vapor for one minute.

The glass substrate was immersed for 90 minutes in a mixture of molten salt comprised of potassium nitrate and sodium nitrate heated to 350 to 400 degrees Centigrade to chemically reinforce the glass disc. The resultant glass substrate was immersed in warm water at 65 degrees Centigrade for one hour to remove the molten salt from the glass substrate.

Next, using a texturing machine (manufactured by Exclusive Design Company), a texture was formed in the primary surface of the glass substrate. The removing depth was 1 nm.

| | |
|---|---|
| Tension of tape member 23: | 22.1 N |
| Moving speed of tape member 23: | 7.6 cm/min |
| Pressure of roller 22: | 30.9 N |
| Rotation speed of glass substrate: | 300 rpm |
| Material of tape member 23: | Polyester |
| Average particle diameter of diamond abrasive grain: | 0.2 micrometers |
| Feeding rate of aqueous diamond slurry: | 20 ml/min |

After the texture forming step S16, the aqueous solution treatment step S17 was conducted. In the aqueous solution treatment step S17, the glass substrate was cleaned using an aqueous solution of potassium hydroxide (pH 10) and a tape. The examination below was made to know whether an alkali oozed from the glass substrate. The glass substrate was allowed to stand at 50 degrees Centigrade for 100 hours, and then observed through an optical microscope to know to whether or not crystals of an alkali metal salt were deposited on the surface of the glass substrate due to oozing of an alkali. In the glass substrate manufactured by the process in Example 1, an alkali in only a very small amount oozed.

The glass substrate was examined with respect to the form of the texture (linear density and asperity (defective protrusion)). The linear density was 8,000 (lines/mm). The maximum height Rmax, which is an index indicating the degree of asperity, was 7.9 (nm). Thus, excellent texture was obtained.

EXAMPLE 2

Substantially the same procedure as in Example 1 was repeated except that a texture was formed in a removing depth of 4 nm. A glass substrate from which an alkali in only a very small amount oozed was obtained. Results were good such that the texture had a linear density of 9,500 (lines/mm) and the maximum height Rmax is 8.5 (nm).

EXAMPLE 3

Substantially the same procedure as in Example 1 was repeated except that a texture was formed in a removing depth of 7 nm. A glass substrate from which an alkali in only a small amount oozed was obtained. Results were good such that the texture had a linear density of 9,500 (lines/mm) and the maximum height Rmax of 9.3 (nm).

EXAMPLE 4

Substantially the same procedure as in Example 1 was repeated except that the foreign matter removing step S15 was conducted before the texture forming step S16. In the foreign matter removing step S15, the glass substrate was immersed in hydrofluoric acid at 50 degrees Centigrade for two minutes to etch the surface of the glass substrate in a depth of 2 nm. A glass substrate from which an alkali in only a very small amount oozed was obtained. Results were good such that the texture had a linear density of 8,000 (lines/mm) and the maximum height Rmax of 7.6 (nm).

EXAMPLE 5

Substantially the same procedure as in Example 4 was repeated except that the foreign matter removing step S15 was conducted before the texture forming step S16 to etch the surface of the glass substrate in a depth of 4 nm, and that a texture was formed in a removing depth of 3 nm. A glass substrate from which an alkali in only a small amount oozed was obtained. Results were good such that the texture had a linear density of 9,300 (lines/mm) and the maximum height Rmax of 8.2 (nm).

COMPARATIVE EXAMPLE 1

Substantially the same procedure as in Example 1 was repeated except that a texture was formed in a removing depth of 12 nm. A glass substrate from which a large amount of an alkali oozed was obtained. Results were unsatisfactory such that the texture had a linear density of 9,200 (lines/mm), the maximum height Rmax of 13.4 (nm), and large asperity.

EXAMPLE 6

Substantially the same procedure as in Example 1 was repeated except that the aqueous solution treatment step S17 was changed. In the aqueous solution treatment step S17, the glass substrate was immersed in pure water at 50 degrees Centigrade and rubbed using a scrubbing member for two minutes. The linear density and asperity of the texture were measured. Results were good such that the texture had a linear density of 8,500 (lines/mm) and the maximum height Rmax of 7.5 (nm).

EXAMPLE 7

Substantially the same procedure as in Example 6 was repeated except that, instead of pure water, an aqueous solution of potassium hydroxide at pH of 10 was used. Results were good such that the texture 21 had a linear density of 8,000 (lines/mm) and the maximum height Rmax of 7.9 (nm).

EXAMPLE 8

Substantially the same procedure as in Example 6 was repeated except that, instead of the scrubbing treatment in the presence of pure water, the glass substrate was showered with an aqueous solution of potassium hydroxide at pH of 10. Results were good such that the texture 21 had a linear density of 8,300 (lines/mm) and the maximum height Rmax of 8.3 (nm).

EXAMPLE 9

Substantially the same procedure as in Example 6 was repeated except that, instead of the scrubbing treatment in the presence of pure water, the glass substrate was irradiated with ultrasonic waves in an aqueous solution of potassium hydroxide at pH of 10. Results were good such that the texture 21 had a linear density of 7,900 (lines/mm) and the maximum height Rmax of 7.6 (nm).

EXAMPLE 10

Substantially the same procedure as in Example 9 was repeated except that, instead of the aqueous solution of potassium hydroxide, an aqueous solution of tetramethylammonium hydroxide at pH of 10 was used. Results were good such that the texture 21 had a linear density of 8,300 (lines/mm) and the maximum height Rmax of 7.6 (nm).

EXAMPLE 11

Substantially the same procedure as in Example 1 was repeated except that the foreign matter removing step S15 was conducted before the texture forming step S16. In the foreign matter removing step S15, the glass substrate 18 was immersed in sulfuric acid at 50 degrees Centigrade for two minutes. Results were good such that the maximum height Rmax was 6.4 (nm).

EXAMPLE 12

Substantially the same procedure as in Example 1 was repeated except that the foreign matter removing step S15 was conducted before the texture forming step S16. In the foreign matter removing step S15, the glass substrate 18 was immersed in oxalic acid at 50 degrees Centigrade for two minutes. Results were good such that the maximum height Rmax was 6.7 (nm).

EXAMPLE 13

Substantially the same procedure as in Example 1 was repeated except that the foreign matter removing step S15 was conducted before the texture forming step S16, and the aqueous solution treatment step S17 using an aqueous solution of potassium hydroxide was conducted after the texture forming step S16. In the foreign matter removing step S15, the glass substrate 18 was immersed in sulfuric acid at 50 degrees Centigrade for two minutes. In the aqueous solution treatment step S17, the glass substrate was cleaned using an aqueous solution of potassium hydroxide at pH of 10 and a tape. Results were excellent such that the maximum height Rmax was 5.7 (nm).

EXAMPLE 14

Substantially the same procedure as in Example 13 was repeated except that the foreign matter removing step S15 using sulfuric acid and ascorbic acid (reductant) was conducted before the texture forming step S16. Results were excellent such that the maximum height Rmax was 4.9 (nm).

EXAMPLE 15

Substantially the same procedure as in Example 10 was repeated except that, instead of the aqueous solution of tetramethylammonium hydroxide, an gas-dissolved solution (pH 7) obtained by dissolving 1.5 ppm of hydrogen gas in pure water was used. The linear density and asperity of the texture 21 were measured. Results were excellent such that the texture 21 had a linear density of 8,300 (lines/mm) and the maximum height Rmax of 6.7 (nm).

EXAMPLE 16

Substantially the same procedure as in Example 9 was repeated except that, instead of the aqueous solution of potassium hydroxide, an gas-dissolved solution (pH 7) obtained by dissolving 1.5 ppm of hydrogen gas in pure water was used. Results were excellent such that the texture 21 had a linear density of 7,900 (lines/mm) and the maximum height Rmax of 6.3 (nm).

It should be apparent to those skilled in the art that the present invention may be embodied in many other specific forms without departing from the spirit or scope of the invention. Particularly, it should be understood that the present invention may be embodied in the following forms.

Before the texture forming step S16, the glass substrate may be cleaned with a neutral or alkaline solution. In this case, foreign matters can be more surely removed from the glass substrate 18 before the texture forming step S16, and thus the glass substrate 18 is prevented from suffering a flaw in the texture forming step S16.

The glass substrate 18 may be treated with an acidic solution between the texture forming step S16 and the aqueous solution treatment step S17. In this case, the effect of removing the abrasive material and iron foreign matters can also be improved.

A neutral solution treatment and an alkaline solution treatment may be conducted in combination. In this case, deformation of the texture 21 is also suppressed.

The gas-dissolved solution may be prepared by degassing pure water and dissolving oxygen gas or ozone in the degassed pure water. As the electrolyzed water, an anolyte taken from an electrolytic cell on the anode side in electrolysis of water may be used.

The present examples and embodiments are to be considered as illustrative and not restrictive, and the invention is not to be limited to the details given herein, but may be modified within the scope and equivalence of the appended claims.

What is claimed is:

1. A method for manufacturing a glass substrate for an information recording medium, the method comprising the steps of:
   forming a glass substrate in a disc form, the glass substrate having a primary surface;
   chemically reinforcing the glass substrate; and
   forming on the primary surface a texture including ridges and valleys extending in a circumferential direction by rubbing the primary surface with a tape member and an abrasive slurry to the extent that an average depth of 0.5 to 10 nm of the primary surface is removed.

2. The method according to claim 1, further comprising, after the texture forming step, a treatment step for treating the primary surface with at least one treatment solution selected from a neutral aqueous solution and an alkaline aqueous solution.

3. The method according to claim 2, wherein the treatment step comprises at least one step selected from the group consisting of: rubbing the primary surface using a belt in the presence of the treatment solution; rubbing the primary surface using a scrubbing member in the presence of the treatment solution; irradiating the primary surface with ultrasonic waves in the presence of the treatment solution; and showering the primary surface with the treatment solution.

4. The method according to claim 2, wherein the alkaline solution is an aqueous solution of tetramethylammonium hydroxide.

5. The method according to claim 2 further comprising the steps of: electrolyzing an aqueous solution containing an inorganic salt to prepare electrolyzed water; and preparing the treatment solution using the electrolyzed water.

6. The method according to claim 5, wherein the electrolyzed water is a catholyte taken from an electrolytic cell on the cathode side.

7. The method according to claim 2, further comprising the steps of: dissolving a gas in water to prepare an gas-dissolved solution; and preparing the treatment solution using the gas-dissolved solution prepared.

8. The method according to claim 7, wherein the gas is hydrogen gas.

9. The method according to claim 1, wherein the average depth is 0.5 to 4 nm.

10. The method according to claim 1, further comprising, before the texture forming step, a step of removing foreign matters from the primary surface.

11. The method according to claim 10, wherein the foreign matter removing step comprises at least one step selected from: a first foreign-matter removing treatment using at least one solution selected from a neutral solution and an alkaline solution; and a second foreign-matter removing treatment using an acidic solution.

12. The method according to claim 11, wherein the first foreign-matter removing treatment is conducted before the second foreign-matter removing treatment.

13. The method according to claim 11, wherein the first foreign-matter removing treatment is conducted after the second foreign-matter removing treatment.

14. The method according to claim 11, wherein the acidic solution is an aqueous solution of at least one kind selected from hydrofluoric acid, fluorosilicic acid, sulfuric acid, nitric acid, hydrochloric acid, sulfamic acid, acetic acid, tartaric acid, citric acid, gluconic acid, malonic acid, and oxalic acid.

15. The method according to claim 11, wherein the acidic solution contains a reductant.

16. The method according to claim 15, wherein the reductant is hydrogen peroxide or ascorbic acid.

17. The method according to claim 11, wherein the total removed thickness of the glass substrate removed in the texture forming step and in at least one of the first foreign-matter removing treatment and the second foreign-matter removing treatment is 10 nm or less.

18. The method according to claim 2, further comprising treating the primary surface with an acidic solution after the texture forming step and prior to the step for treating the primary surface with at least one treatment solution selected from the neutral aqueous solution and the alkaline aqueous solution.

19. The method according to claim 1, wherein the chemical reinforcing step is conducted so that the primary surface of the glass substrate has an average surface roughness Ra of 0.1 to 1.5 nm.

20. The method according to claim 1, wherein:
   a compression stress layer is formed in said chemically reinforcing step, the compression stress layer containing large ions at a high concentration and the region underneath the compression stress layer containing small ions at a high concentration; and
   after said texture forming step, a portion of the compression stress layer remains to prevent the small ions in the region underneath the compression stress layer from being oozed.

* * * * *